United States Patent
Yamashita et al.

(10) Patent No.: US 8,479,897 B2
(45) Date of Patent: Jul. 9, 2013

(54) BOLT FOR HYDRAULIC DISC BRAKE CALIPER

(75) Inventors: Takahiro Yamashita, Sakai (JP); Shinichi Takizawa, Sakai (JP)

(73) Assignee: Shimano Inc., Sakai (JP)

( * ) Notice: Subject to any disclaimer, the term of this patent is extended or adjusted under 35 U.S.C. 154(b) by 434 days.

(21) Appl. No.: 12/498,161

(22) Filed: Jul. 6, 2009

(65) Prior Publication Data

US 2011/0000748 A1    Jan. 6, 2011

(51) Int. Cl.
*B60T 11/00* (2006.01)

(52) U.S. Cl.
USPC .......................................... 188/344; 411/418

(58) Field of Classification Search
USPC .................. 411/418, 419, 395, 417; 188/344, 188/26, 352, 370; 285/190, 191, 391
See application file for complete search history.

(56) References Cited

U.S. PATENT DOCUMENTS

| | | | |
|---|---|---|---|
| 3,943,817 A | 3/1976 | Mes | |
| 5,011,192 A * | 4/1991 | Campo | 285/23 |
| 5,228,725 A * | 7/1993 | Aoyagi et al. | 285/141.1 |
| H1258 H * | 12/1993 | Hindle, Jr. | 416/215 |
| 5,515,948 A | 5/1996 | Gilliland | |
| 5,533,764 A * | 7/1996 | Williamson | 285/212 |
| 6,679,663 B2 * | 1/2004 | DiStasio et al. | 411/329 |
| 6,688,440 B2 | 2/2004 | Matsushita | |
| 7,017,952 B2 * | 3/2006 | Brewer et al. | 285/391 |
| 2003/0108403 A1 * | 6/2003 | Scoyoc | 411/421 |
| 2007/0182156 A1 * | 8/2007 | Petrykowski | 285/190 |

FOREIGN PATENT DOCUMENTS

| | | |
|---|---|---|
| AT | 413298 B | 1/2006 |
| DE | 2309330 | 9/1973 |
| DE | 103 09 297 A1 | 9/2004 |
| GB | 2007147 A1 | 5/1979 |
| JP | 09004622 A | 1/1997 |
| JP | 09004623 A | 1/1997 |
| JP | 09021411 A | 1/1997 |

* cited by examiner

*Primary Examiner* — Robert A Siconolfi
*Assistant Examiner* — Stephen Bowes
(74) *Attorney, Agent, or Firm* — Jeffer Mangels Butler & Mitchell LLP

(57) ABSTRACT

A bolt for use with a hydraulic disc brake caliper. The bolt includes a head and a shaft extending outwardly from the head. The shaft includes a threaded portion having a diameter, at least one channel defined at least partially in the outer surface of the threaded portion, and a reduced diameter portion defined at least partially circumferentially around the shaft and located between the head and the threaded portion. When the bolt is threaded into an opening, the at least one channel and the reduced diameter portion are in fluid communication.

3 Claims, 7 Drawing Sheets

BOLT FOR HYDRAULIC DISC BRAKE CALIPER

FIELD OF THE INVENTION

The present invention relates to bolts for hydraulic disc brake calipers, and more particularly, to a bolt that includes channels therein for a hydraulic disc brake caliper.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or back wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor.

When initially filling the hydraulic disc brake system (including the master cylinder and the caliper), the system must be bled to remove gas bubbles from the system and optimize performance of the brakes. Some prior art calipers include what is called a banjo fitting that includes a banjo bolt. A banjo fitting comprises a perforated hollow bolt and spherical union for fluid transfer. The name stems from the shape of the fitting, having a large circular section connected to a thinner pipe, generally similar to the shape of a banjo. However, during bleeding, bubbles are often caught inside the hollow axial portion of the typical banjo bolt. A need exists for a bolt used with a hydraulic disc brake that is easy to bleed.

SUMMARY OF THE PREFERRED EMBODIMENTS

According to a first aspect of the present invention, there is provided a bolt for use with a hydraulic disc brake caliper. The bolt includes a head and a shaft extending outwardly from the head. The shaft includes a threaded portion having a diameter, at least one channel defined at least partially in the outer surface of the threaded portion, and a reduced diameter portion defined at least partially circumferentially around the shaft and located between the head and the threaded portion. When the bolt is threaded into an opening, the at least one channel and the reduced diameter portion are in fluid communication. In a preferred embodiment, the shaft includes three channels that extend parallel to the axis of the shaft and are spaced about 120° apart from one another.

In accordance with another aspect of the present invention, there is provided a hydraulic disc brake caliper assembly that includes a housing having at least one fluid conduit disposed therein, a bolt received in an opening in the housing, a fluid coupling unit having an opening defined therethrough, and a fluid path. The bolt extends through the opening in the fluid coupling unit and into the opening in the housing. The bolt includes a head and a shaft extending outwardly from the head. The shaft includes a threaded portion, at least one channel defined in the outer surface of the threaded portion, and a reduced diameter portion defined at least partially circumferentially around the shaft and located between the head and the threaded portion. The fluid path extends from the fluid conduit through the at least one channel defined in the outer surface of the bolt, through the reduced diameter portion and to the fluid coupling unit.

In accordance with another aspect of the present invention there is provided a fluid coupling unit assembly that includes a fluid coupling unit having an opening defined therethrough, a bolt, and a fluid path. The interior surface of the opening in the fluid coupling unit has a diameter and has a hole defined therein that is in fluid communication with a hydraulic line extending from the fluid coupling unit. The bolt has a head and a shaft extending outwardly from the head. The shaft includes a threaded portion, at least one channel defined in the outer surface of the threaded portion and a reduced diameter portion defined circumferentially around the shaft and located between the head and the threaded portion. The reduced diameter portion has a diameter that is less than the diameter of the inner surface of the fluid coupling unit. The shaft extends through the opening in the fluid coupling unit. The fluid path extends through the at least one channel defined in the outer surface of the bolt, through the reduced diameter portion, through the hole in the inner surface of the fluid coupling unit and to the hydraulic line.

The present invention is applicable to all types of devices and is not limited to bicycles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
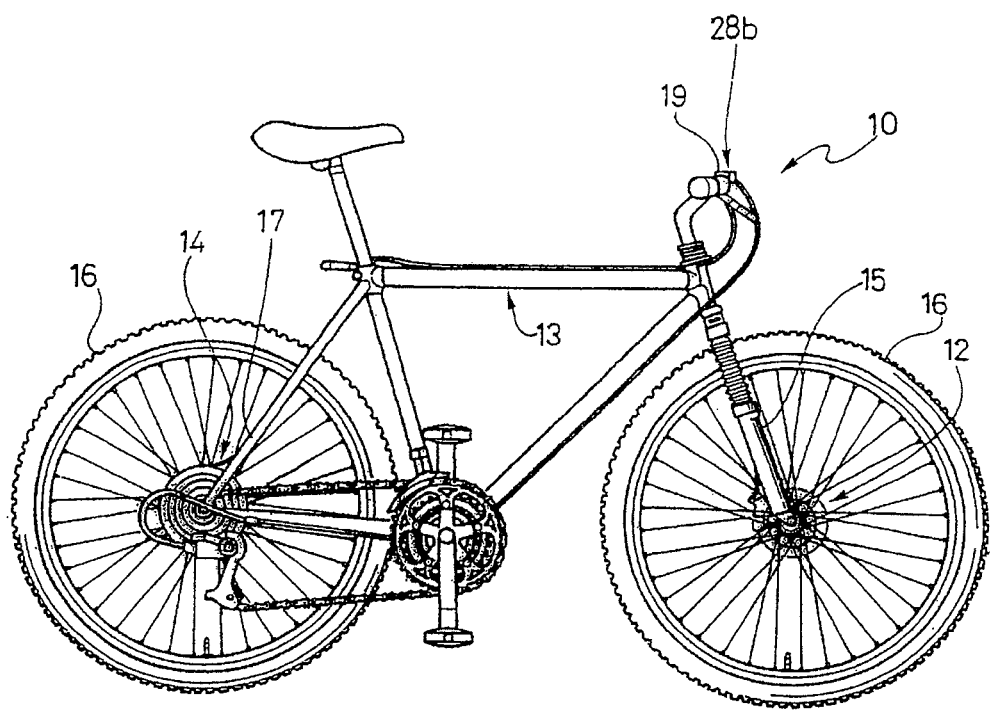
FIG. 1 is a side elevational view of a bicycle with a front disc brake assembly and a rear disc brake assembly in accordance with an embodiment of the present invention.
Figure 2:
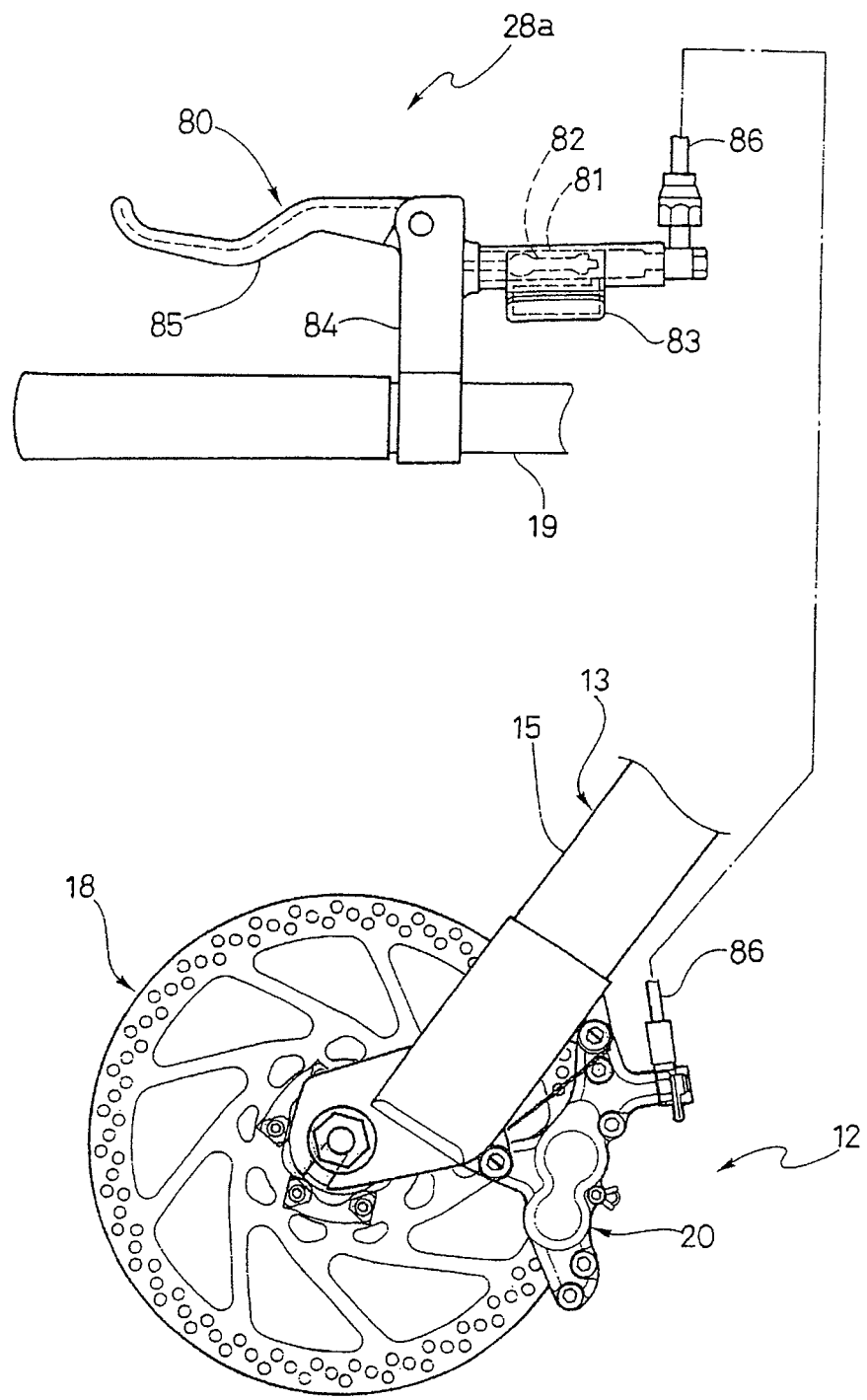
FIG. 2 is a side elevational view of the front disc brake assembly coupled to a front fork and a front disc brake operating mechanism of the bicycle illustrated in FIG. 1.
Figure 3:
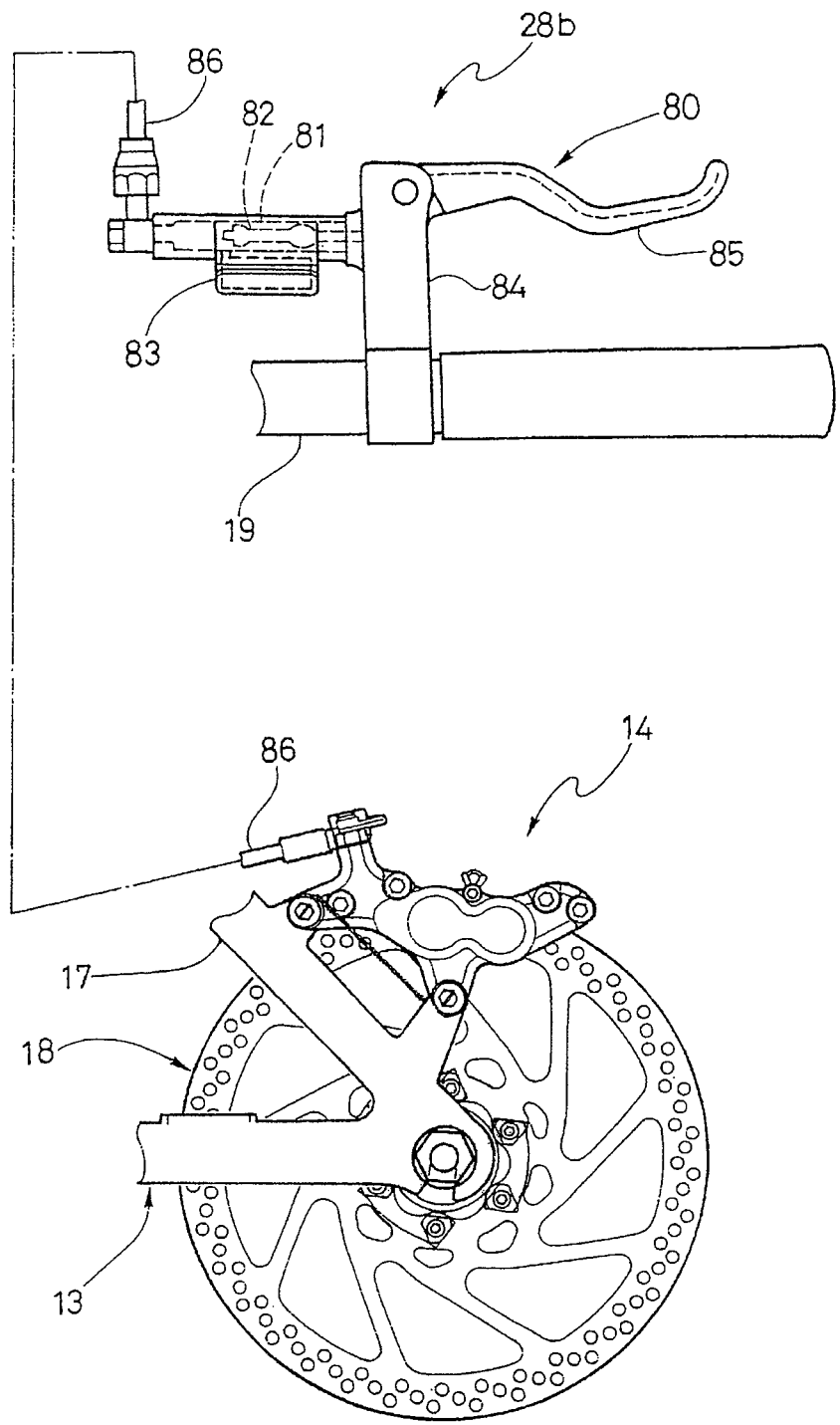
FIG. 3 is a side elevational view of the rear disc brake assembly coupled to a rear fork and a rear disc brake operating mechanism of the bicycle illustrated in FIG. 1.

Referring initially to FIGS. 1-3, a preferred embodiment of a bicycle disc brake caliper that includes an inventive bolt that provides a fluid path is described. The bicycle disc brake caliper is preferably a hydraulic brake disc caliper operatively connected to a hydraulic brake lever assembly.

It will be appreciated that terms such as "front," "back," "top," "bottom," "side," and the like used herein are merely for ease of description and refer to the orientation of the components as shown in the figures. It should be understood that any orientation of the caliper and/or bolt and the components thereof described herein is within the scope of the present invention.

As shown in FIG. 1, a bicycle 10 with a front disc brake assembly 12 and a rear disc brake assembly 14 is illustrated in accordance with a preferred embodiment of the present invention. Other than the bolt described below used in the calipers, the front and rear disc brake assemblies 12 and 14 are relatively conventional fluid operated disc brakes fixedly coupled to a frame 13. Therefore, many of the components of the disc brake assemblies 12 and 14 will not be discussed or illustrated in detail herein except as modified by the preferred embodiments of the present invention, as discussed below.

Specifically, front disc brake assembly 12 is fixedly coupled to a front fork 15 of frame 13, and rear disc brake assembly 14 is fixedly coupled to rear fork 17 of frame 13. Frame 13 includes a handle bar 19 mounted to front fork 15 to steer the bicycle 10. Bicycle 10 includes a pair of wheels 16 rotatably coupled to the bicycle frame 13. One wheel 16 is coupled to front fork 15, and one wheel 16 is coupled to rear fork 17. Each wheel 16 has a disc brake rotor 18 fixedly coupled thereto in a conventional manner.

The bicycle 10 and various components thereof are relatively conventional. Therefore, bicycle 10 and its various components will not be discussed or illustrated in detail herein. Moreover, front and rear disc brake assemblies 12 and 14 are substantially identical. Therefore, it will be understood that bolt 50 can be used with both front disc brake assembly 12 or rear disc brake assembly 14. It will further be understood that the front and rear disc brake assemblies 12 and 14 can include calipers that have any number of pistons therein. For example, the calipers shown in FIGS. 2 and 3 are four piston type calipers. However, other calipers include only two pistons. Accordingly, a caliper with any number of pistons is within the scope of the present invention provided the calipers include the inventive bolt 50 described below.

Front disc brake assembly 12 basically includes calipers and a brake operating mechanism or lever assembly 28a. The caliper includes a caliper housing 20, a pair of friction members or pads (not shown), and a plurality of pistons (not shown) disposed in the housing 20. Caliper housing 20 is fixedly coupled to front forks 15 in a conventional manner using threaded fasteners. First and second friction members are coupled to caliper housing 20 to form a rotor receiving slot therebetween. At least one of the friction members is movable relative to caliper housing 20, and preferably both friction members are movable relative to caliper housing 20. At least one piston is movably coupled to caliper housing 20. Preferably, each piston is movably coupled to caliper housing 20.

Brake operating mechanisms 28a and 28b are conventional disc brake operating mechanisms. Therefore, brake operating mechanisms 28a and 28b will not be discussed or illustrated in detail herein. It will be understood that the calipers shown in FIGS. 1-3 are for illustrative purposes only. Brake operating mechanisms 28a and 28b are provided to control disc brake assemblies 12 and 14. Brake operating mechanisms 28a and 28b are preferably fixedly mounted on handle bar 19 adjacent the hand portions of handle bar 19. Accordingly, brake operating mechanisms 28a and 28b are operated in a conventional manner such that disc brake assemblies 12 and 14 move friction members from a release position in which bicycle wheels 16 and the disc brake rotors 18 are free to rotate, and a braking position. In the braking position, disc brake assemblies 12 and 14 apply a braking force against disc brake rotor 18 to stop rotation of bicycle wheels 16 and disc brake rotors 18.

Brake operating mechanisms 28a and 28b will now be described in more detail. Basically, brake operating mechanisms 28a and 28b are designed to actuate the disc brake assemblies 12 and 14 in a conventional manner to apply a forcible gripping action on disc brake rotor 18 to stop rotation of one of the front wheels 16. Brake operating mechanism 28b actuates rear disc brake assembly 14 and brake operating mechanism 28a actuates front disc brake assembly 12. Brake operating mechanism 28b is identical to brake operating mechanism 28a except brake operating mechanism 28b is a mirror image of brake operating mechanism 28a. Each of the brake operating mechanisms 28a and 28b basically includes a brake lever 80, a hydraulic or master cylinder 81, a hydraulic or master piston 82, and an actuation fluid reservoir 83. Preferably, each of the brake operating mechanisms 28a and 28b is a single unit, which is mounted on handlebar 19.

In particular, referring to either one of the brake operating mechanisms 28a and 28b, brake lever 80 includes a mounting portion 84 and a lever portion 85. Mounting portion 84 is designed to be clamped onto handle bar 19 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Figure 7:
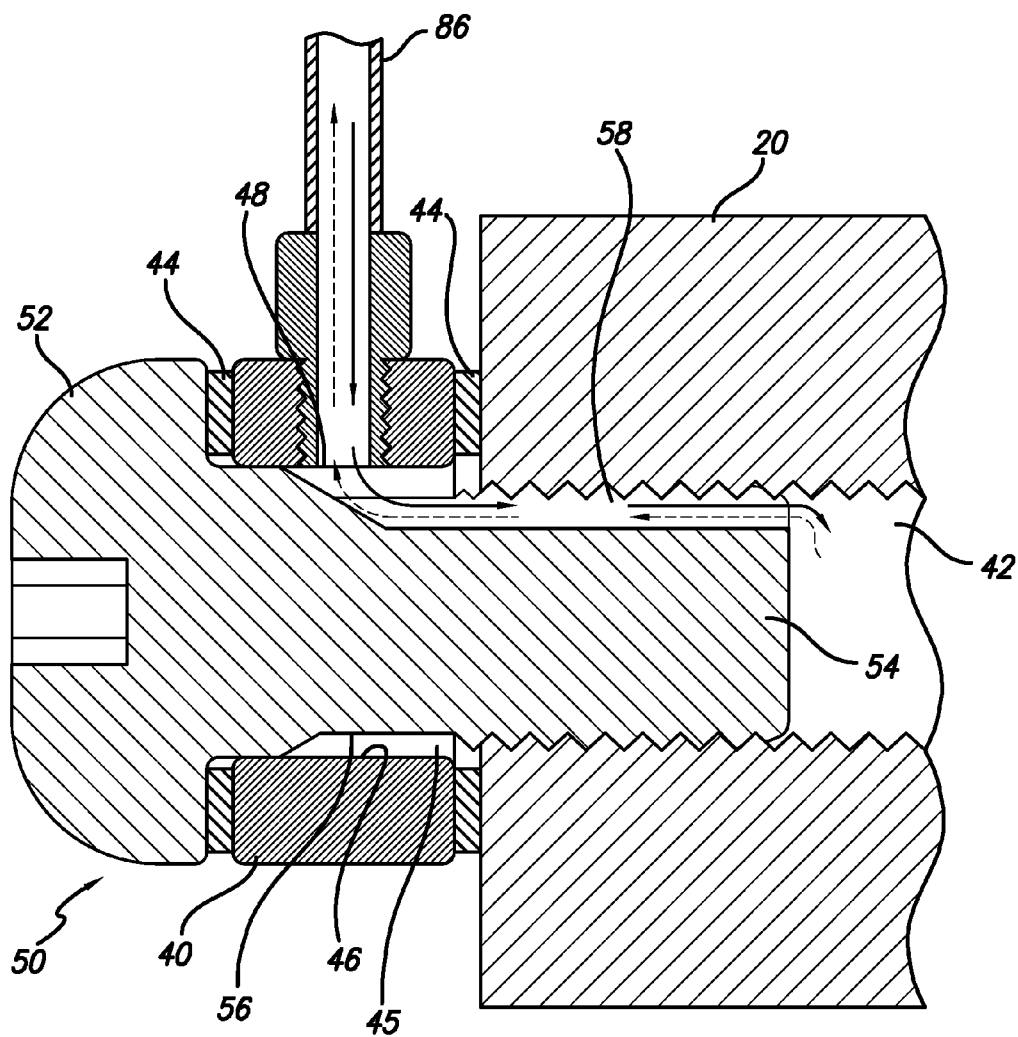
FIG. 7 is a cross-sectional view of the bolt of FIG. 4 received in and providing fluid communication between a fluid coupling unit and a caliper housing.

Master piston 82 is movably mounted within master cylinder 81 in a conventional manner. More specifically, actuation fluid reservoir 83 is mounted on master cylinder 81 and is in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to one of the disc brake assemblies 12 and 14 via fluid coupling units 40. Thus, the pressurized actuating fluid causes the pistons and friction members to move so as to engage disc brake rotors 18 to stop rotation of wheels 16. Referring to FIGS. 4-7, a bolt 50 for use with the caliper housing 20 of a hydraulic disc brake system is shown and described. The bolt 50 includes a head 52, a shoulder 53, a shaft 54, a reduced diameter portion 56 and a plurality of channels 58. As is shown in FIG. 7, the bolt 50 is received in a fluid conduit 42 of the caliper housing 20 (It will be understood that the housing 20 includes a plurality of fluid conduits). This bolt 50 replaces the banjo bolt (discussed above in the Background of the Invention section) that was previously used in this type of hydraulic braking system. As is shown in FIG. 7, the shaft 54 of bolt 50 is received in an opening 45 in fluid coupling unit 40 and is threaded (via threads 60) into the fluid conduit 42. Furthermore, the head 52 has a diameter D1, the shoulder 53 has a diameter D2, the threads 60 have a diameter D3 and the reduced diameter portion 56 has a diameter D4. As shown in FIG. 7, D1 is greater than D2, D2 is greater than D3, and D3 is greater than D4.

With the previous banjo bolt, the fluid path passed through the fluid conduit 42 of the caliper housing, through the axial opening in the banjo bolt and out of a transverse opening that was in fluid communication with the fluid coupling unit (or vice versa, depending on the direction of fluid flow). In the present invention, as shown in FIG. 7, the fluid path passes through the channels 58, to the reduced diameter portion 56 and out through the fluid coupling unit 40 to the master cylinder (via the hydraulic line 86). The assembly can include o-rings 44 for sealing the fluid path. As is shown in FIG. 7, the channels 58 and the reduced diameter portion 56 are in fluid communication.

Figure 8:
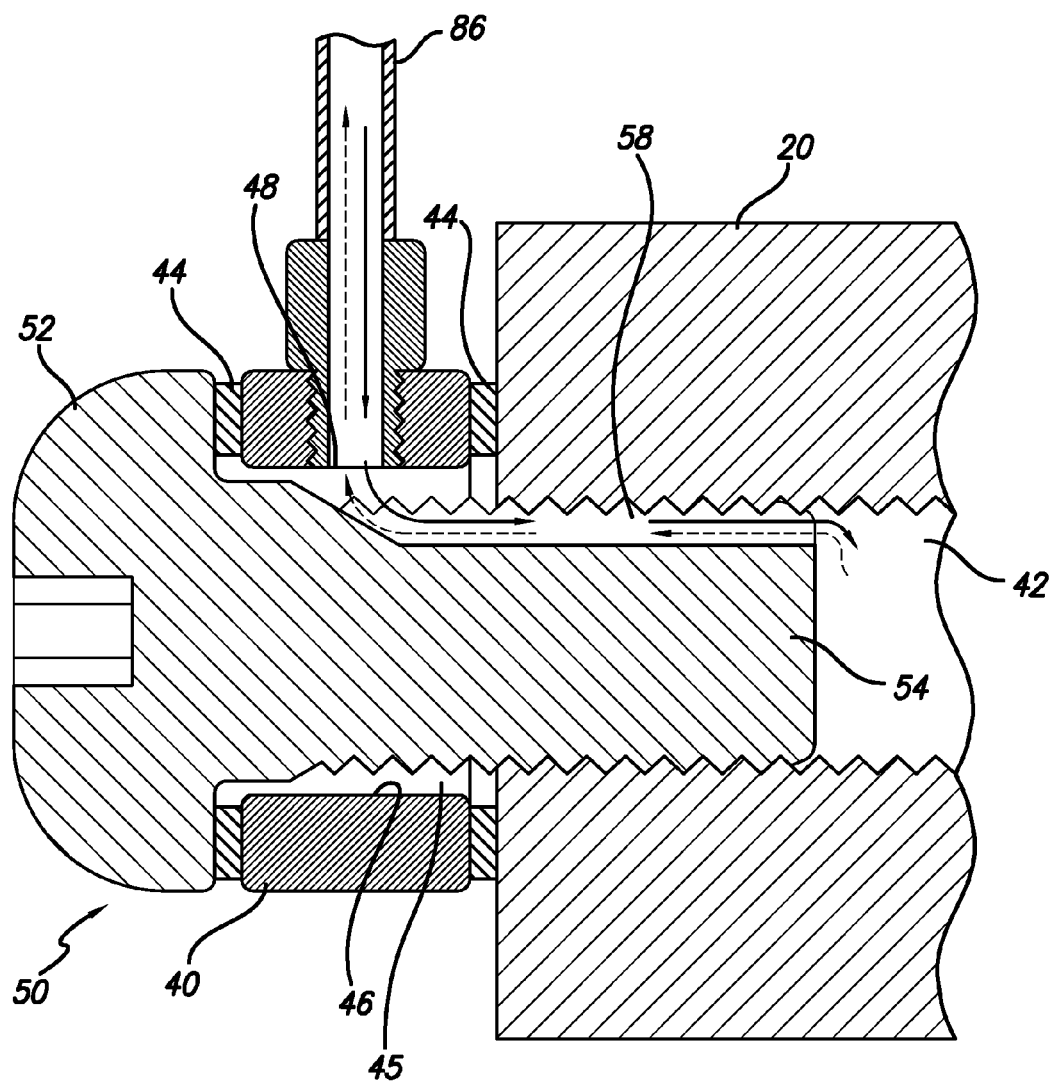
FIG. 8 is a cross-sectional view of a bolt received in and providing fluid communication between a fluid coupling unit and a caliper housing in accordance with another embodiment of the invention.

The interior surface 46 of the opening 45 in the fluid coupling unit 40 has a diameter and has a hole 48 defined therein that is in fluid communication with the hydraulic line 86 extending from the fluid coupling unit 40. As can be seen in FIG. 7, the diameter of the reduced diameter portion 56 has a diameter that is less than the diameter of the inner surface 46 of the fluid coupling unit 40. This creates a space that is part of the fluid path. In another embodiment, as shown in FIG. 8, the reduced diameter portion can be omitted and the diameter of the opening 45 in the fluid coupling unit 40 can be large enough that a space is defined between the outer surface or diameter of the shaft 54 (and the shoulder of the bolt head 52) and the inner surface 46 of the fluid coupling unit 40.

Figure 5:
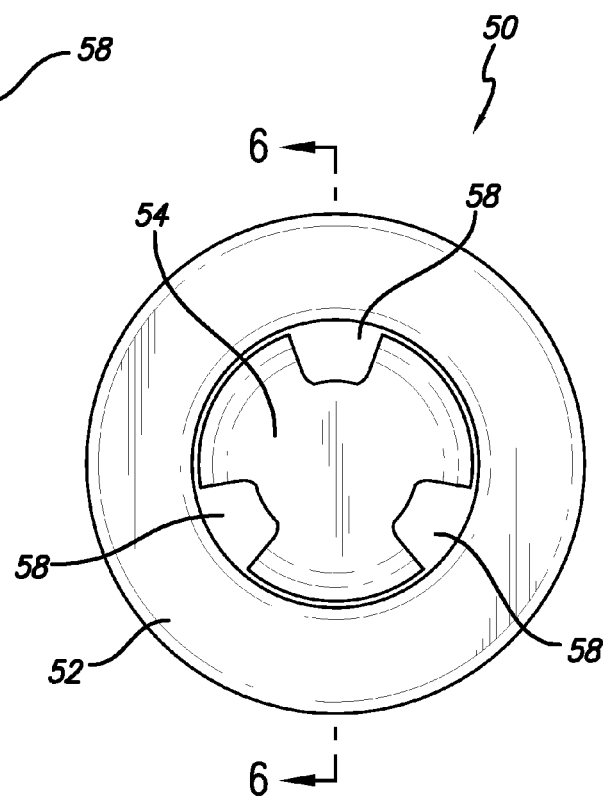
FIG. 5 is a bottom plan view of the bolt of FIG. 4.
Figure 6:
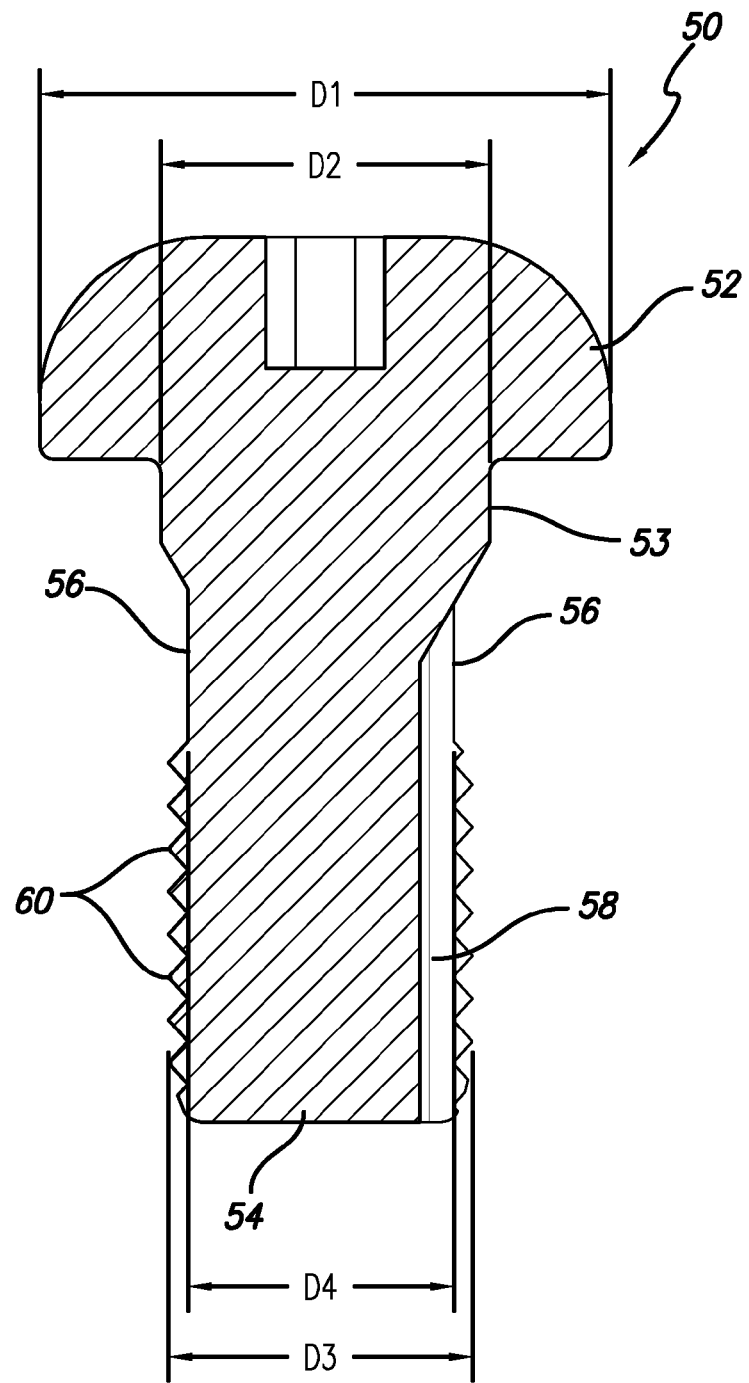
FIG. 6 is a cross-sectional view of the bolt of FIG. 4 taken along line 6-6 of FIG. 5.

In a preferred embodiment, the shaft 54 of the bolt 50 includes three axially extending channels 58 arranged circumferentially therearound and spaced apart 120°, as is shown in FIG. 5. However, any number of channels 58 (e.g., one or more) are within the scope of the present invention. Also, the channels 58 do not have to be spaced equidistant from one another. The channels 58 preferably extend parallel to the axis of the shaft 54. However, this is not a limitation on the present invention. For example, the channels could extend in a spiral around the shaft 54. The goal of the channels 58 is to allow fluid to flow from the end of the shaft 54 furthest from the head 52 to the recessed portion or reduced diameter portion 56 so that it can exit out of the fluid coupling unit 40. If the channels 58 were to extend in a spiral shape, it will be understood that the fluid is still flowing generally axially along the outside of the shaft 54, but that it is not necessarily parallel to the axis. Therefore, as used herein, generally axially means the distance traveled by the channels can be parallel to the axis or non-parallel to the axis as long as the total distance is further in an axial direction than in a transverse direction.

Figure 4:
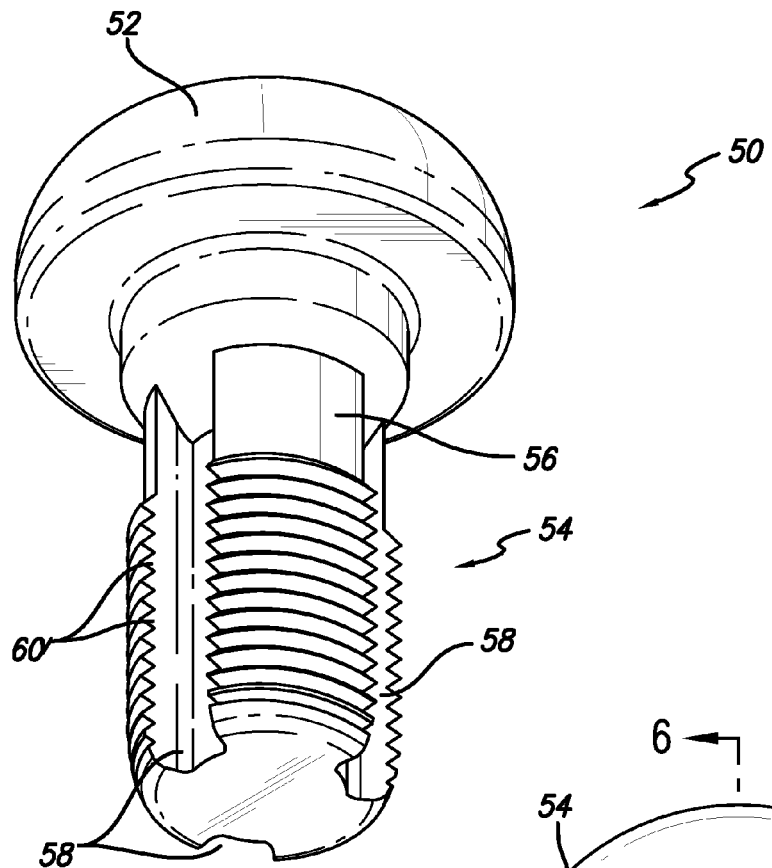
FIG. 4 is a perspective view of a bolt for use with a hydraulic disc brake in accordance with an embodiment of the present invention.

As is shown in FIG. 4, the reduced diameter portion 56 extends circumferentially around the shaft 54. In a preferred embodiment, the reduced diameter portion 56 extends all the way or 360 around the shaft 54. However, this is not a limitation on the present invention. In another embodiment, the reduced diameter portion 56 may only extend partially around the shaft 54. It will be understood that an inventive aspect of the present invention is that at least a portion of the fluid path extends axially along the shaft 54 and is open to the outside of bolt 50.

It will be understood that the fluid path described above is reversible. The fluid may be traveling in a different direction whether the brake system is being filled, emptied or in use.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A hydraulic disc brake caliper assembly comprising:
a housing having at least one fluid conduit disposed therein, a bolt received in an opening in the housing, wherein the bolt includes a head that includes a shoulder having an outer circumferential surface, wherein the head has a first diameter and the outer circumferential surface of the shoulder has a second diameter, a shaft defining an axis and extending outwardly from the shoulder, wherein the shaft includes a threaded portion having a third diameter, a plurality of channels defined in the outer surface of the threaded portion, wherein the channels extends generally axially along the shaft and generally parallel to the axis of the shaft, and a reduced diameter portion defined at least partially circumferentially around the shaft and located between the shoulder and the threaded portion, wherein the reduced diameter portion has a fourth diameter, wherein the first diameter is greater than the second diameter, the second diameter is greater than the third diameter, and the third diameter is greater than the fourth diameter, wherein when the bolt is threaded into an opening, the plurality of channels and the reduced diameter portion are in fluid communication, and wherein the outer circumferential surface of the shoulder extends generally parallel to the axis of the shaft,
a fluid coupling unit having an opening with an inner surface defined therethrough, wherein the bolt extends through the opening in the fluid coupling unit and into the opening in the housing, and a first portion of the inner surface is in contact with the outer circumferential surface of the shoulder of the bolt, wherein a space is defined between a second portion of the inner surface of the fluid coupling unit not in contact with the shoulder and the reduced diameter portion of the shaft of the bolt,
a fluid path that extends from the fluid conduit through the channels defined in the outer surface of the bolt, to the reduced diameter portion, through the space and to the fluid coupling unit.

2. The hydraulic disc brake caliper assembly of claim 1 wherein the reduced diameter portion extends circumferentially around the shaft.

3. The hydraulic disc brake caliper assembly of claim 2 wherein the shaft includes three channels that extend parallel to the axis of the shaft and are spaced about 120° apart from one another.

* * * * *